United States Patent [19]

Allain et al.

[11] 4,202,729

[45] May 13, 1980

[54] DEVICE FOR THE CHARGE AND DISCHARGE OF NUCLEAR REACTION FUEL ASSEMBLIES

[75] Inventors: Albert Allain, Bruyeres-le-Chatel; Jacqui Buret, Saulx les Chartreux; André Plagnard, Montrouge, all of France

[73] Assignee: Commissariat a l'Energie Atomique, Paris, France

[21] Appl. No.: 839,032

[22] Filed: Oct. 3, 1977

[30] Foreign Application Priority Data

Oct. 15, 1976 [FR] France .................................. 76 31060

[51] Int. Cl.² ...................... G21C 19/20; B66C 17/08; B66C 1/10
[52] U.S. Cl. .................................. 176/30; 294/86 A; 414/146
[58] Field of Search ............................ 176/30, 31, 32; 214/18 N; 294/86 A

[56] References Cited

U.S. PATENT DOCUMENTS

| 3,915,792 | 10/1975 | Albert | 176/30 |
| 3,997,393 | 12/1976 | Allain | 176/30 |
| 4,069,098 | 1/1978 | Wade | 176/30 |
| 4,096,031 | 6/1978 | Wade | 176/32 |

Primary Examiner—Samuel W. Engle
Assistant Examiner—Donald P. Walsh

[57] ABSTRACT

Two guide ramps for the transfer of fuel assemblies in sliding motion between the reactor core and an external storage container are surmounted by a lock-chamber in which two pivotally suspended rectilinear rail sections carried by a revolving unit form guide ramp extensions. Each rail section has a lever extension in cooperating relation with a rocking system for displaying the rail section in swinging motion from an inclined position in the line of extenson of one of the guide ramps to the vertical position and conversely.

6 Claims, 4 Drawing Figures

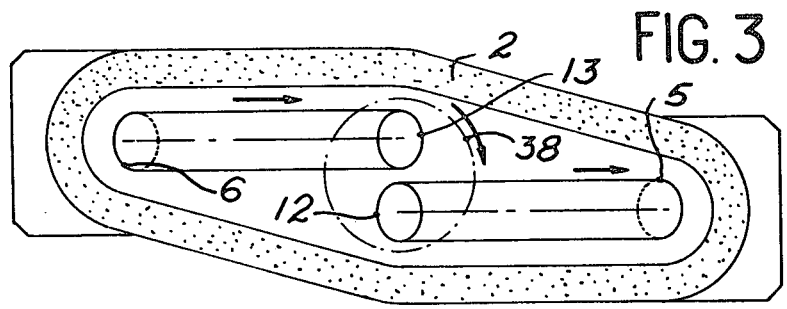
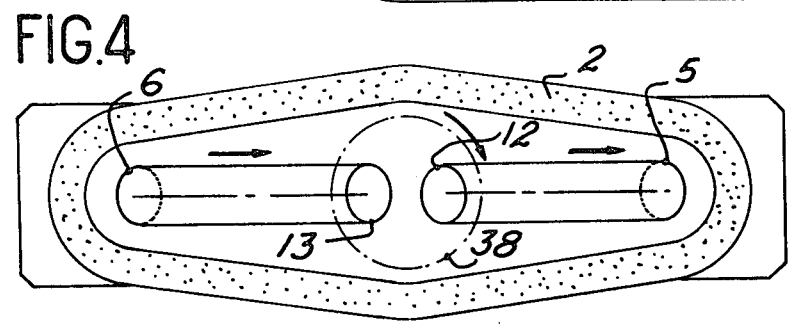
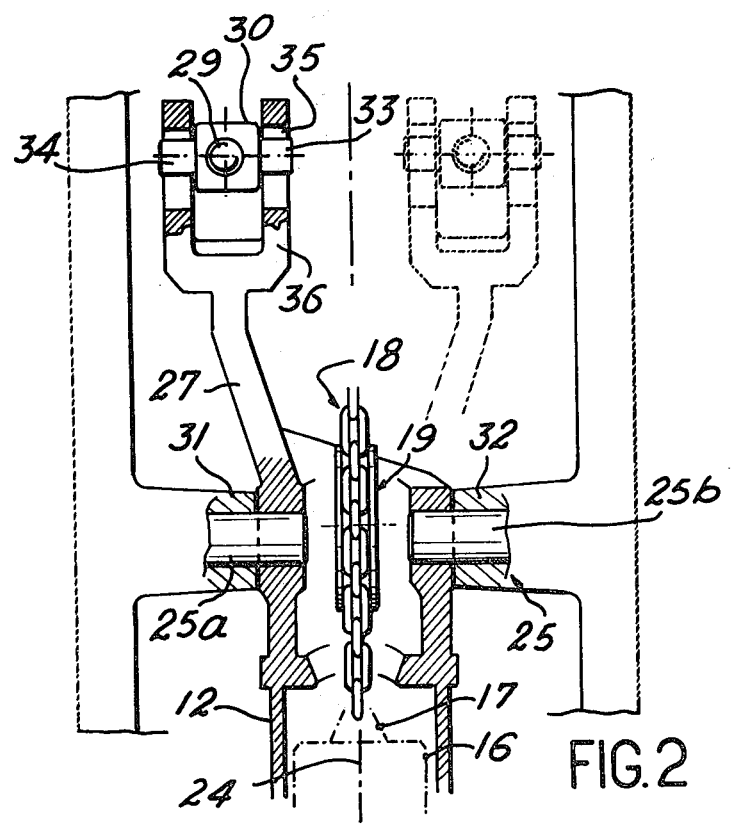

DEVICE FOR THE CHARGE AND DISCHARGE OF NUCLEAR REACTION FUEL ASSEMBLIES

This invention relates to a device for the charge and discharge of fuel assemblies in a nuclear reactor and especially although not exclusively in a liquid-sodium cooled fast reactor.

A number of different forms of construction of charge-discharge devices are already known, especially for the purpose of rapid handling of fuel assemblies while ensuring reliable containment of the atmosphere which is in contact with the interior of the reactor during transfer of fuel assemblies. This applies in particular to the transfer of a fresh fuel assembly from a storage container to the interior of the reactor vessel or conversely of an irradiated fuel assembly which is withdrawn from the reactor vessel and returned to the storage container or to an external receiving chamber.

More specifically, devices of the type comprising a leak-tight lock-chamber placed over the ends of two inclined guide ramps on the upper face of the top shield slab which closes a reactor vessel have already been constructed. Said inclined guide ramps are sealed-off by means of isolating valves which ensure suitable protection against contamination by alpha particles and gamma radiation. The intended function of said guide ramps is to carry out respectively the transfer of the fuel assemblies either to the reactor core within the pressure vessel or to the storage container. To this end, a swinging rocker-arm system is mounted within said lock-chamber so that a single rail section pivotally mounted on a horizontal shaft carried by the lock-chamber can be placed successively in the line of extension of one guide ramp and then the other guide ramp. A fuel assembly placed within a transfer flask so as to constitute a moving system can be displaced along the rail within the lock-chamber by means of a winch or the like and caused to slide along one of the guide ramps when the corresponding valve has been opened. Said fuel assembly can then be placed in the line of extension of the other guide ramp as a result of displacement of said rail in swinging motion and can finally be moved downwards on the second guide ramp towards the pressure vessel or the storage container. Depending on requirements, this device makes it possible to introduce into the reactor vessel fresh fuel assemblies obtained from the storage container or conversely to withdraw irradiated fuel assemblies from the reactor core and return these latter to said container. The rocker-arm system comprises a horizontal screw for displacing a nut which is fixed on the rail section, the amplitude of angular displacement being such as to correspond to the transfer from one guide ramp to the other. Finally, the winch is located within the lock-chamber above the axis of swinging motion in order to handle the fuel assemblies on either of the two guide ramps. It is in fact apparent that, when employing a device of this type, the frequency of loading or unloading is relatively limited since fresh or irradiated fuel assemblies can pass through the lock-chamber only one by one.

Another more highly improved device which is also known makes it possible to double the utilization frequency. This device accordingly makes use of a revolving unit within a protective lock-chamber placed as in the previous instance over two inclined guide ramps which lead respectively to the reactor vessel and to an external storage container. Said revolving unit comprises two rail sections in rigidly fixed relation and arranged symmetrically on each side of a vertical midplane in order to be located in the line of extension of the two guide ramps which are also in angularly displaced relation. A movement of rotation of said revolving unit through an angle of 180° then brings each rail section into a position of correspondence with the other guide ramp and conversely. In a design solution of this type, it is found necessary to reduce the volume generated by the revolving unit during rotation of this latter and to limit the weight and overall size of the lock-chamber. To this end, the rail sections are advantageously curved at their upper ends in order to extend vertically and to be juxtaposed at the top portion to a height which is capable of containing the moving system. In consequence, the upper portions of the two rail sections envelop a cylinder and not a cone in pivotal motion. Two handling winches are mounted directly above the two rail sections and operate in parallel. One winch serves to displace an irradiated fuel assembly on an inclined ramp whilst the other winch brings a fresh fuel assembly onto the opposite ramp. As a result of pivotal motion of the revolving unit, the rail sections can thus be caused to correspond to the two opposite ramps in order to exchange a fresh fuel assembly for an irradiated assembly or conversely.

One form of construction of the device mentioned in the foregoing has been described in particular in French patent No. 2,267,614 in the name of Commissariat à l'Energie Atomique. Although this device offers appreciable advantages, especially insofar as it permits of a higher rate of loading and unloading, it still suffers from certain drawbacks. In particular, the degree of curvature which permits resetting of the moving systems in the vertical position on each rail section is necessarily of small value since this restoration to the vertical position can only be very progressive. This is explained by the presence of the liquid sodium within the transfer flask together with the fuel assembly and also by the fact that the winch which controls the displacement of the moving system operates at very low speed. The time of travel of the moving system is therefore of fairly long duration whilst the fuel assembly is placed in a relatively high position above the reactor vault roof or top shield slab at the end of travel, thus resulting in prohibite overall height of the lock-chamber. Moreover, the moving system and in particular the revolving unit which begins to rotate in order to transfer fuel assemblies from one guide ramp to the other entails the need for a curved portion of the rail sections at the lower end. It is therefore the eccentricity of these elbowed sections which determines the volume occupied in rotation which, in a diametral plane, is seen to be appreciably larger than the overall volume of two moving systems placed vertically in juxtaposed relation on each side of the axis of rotation. Finally, in order to operate correctly, the system makes it necessary to ensure that the two inclined ramps onto which the moving systems are brought are symmetrical with respect to each other about the vertical axis of pivotal motion of the revolving unit. A design solution of this type is therefore unsuitable if the guide ramps have different angles of inclination respectively towards the reactor vessel and towards the storage container.

The present invention relates to a loading and unloading device which overcomes the disadvantages attached to known solutions in the prior art and makes it possible in particular to maintain a high rate of handling of fuel assemblies while reducing the overall size of the transfer lock-chamber and making it possible to adapt this latter to the case in which the ramps for guiding the fuel assemblies do not have the same angle of inclination.

To this end, the device under consideration comprises a leak-tight lock-chamber placed over the ends of two guide ramps on the top closure slab of the reactor, said ramps being sealed-off by means of valves and adapted to communicate respectively with the reactor vessel and with an external storage container. Provision is made within the lock-chamber for two rail sections which are carried by a revolving unit having a vertical axis and form extensions of the two guide ramps. A moving system together with a fuel assembly to be loaded or unloaded is intended to be displaced in sliding motion along each guide ramp under the action of a drive winch placed at the top portion of the lock-chamber. The device is distinguished by the fact that each rectilinear rail section is pivoted about a horizontal shaft carried by a frame pivotally mounted within the lock-chamber and comprises a lever which forms an extension of said rail section beyond the shaft thereof. Said lever cooperates with a rocking system which is capable of displacing the rail section from its inclined position in the line of extension of one of the guide ramps to the vertical position or conversely.

The device in accordance with the invention thus combines the swinging movements of the rail sections with a movement of rotation of the revolving unit in order to reset these rail sections in the vertical position and to reverse the correspondence of these latter with the two guide ramps with a view to introducing a fresh fuel assembly into the reactor vessel while at the same time withdrawing from this latter an irradiated fuel assembly which is received within a storage container at the end of the operation.

A number of alternative forms of construction can accordingly be contemplated according as the guide ramps are inclined to the vertical axis of rotation of the revolving unit while being located in the same plane or in two parallel planes displaced laterally with respect to said axis. In the alternative form of construction just mentioned, if the angle of inclination of the guide ramps is identical, the pivotal axes of the two rail sections can coincide in order to constitute a single axis, the sections being juxtaposed after a swinging movement in a plane at right angles to the plane of symmetry of the ramps.

In a preferred embodiment of the invention, the rocking system of each lever which forms an extension of a rail section comprises a horizontal screw carried by the revolving frame and driven in rotation about its own axis so as to produce the displacement of a captive nut along said screw, said nut being secured against rotation by means of lateral lugs engaged in openings formed in a stirrup-piece provided at the end of said lever. As an advantageous feature, the openings of the stirrup-piece have an elongated shape in order to permit displacement of the lugs under the action of the pivotal motion of the rail section about its axis which is produced by the rocking system.

Further distinctive features of a loading and unloading device in accordance with the invention will become apparent from the following description of a number of examples of construction which are given by way of indication without any limitation being implied, reference being made to the accompanying drawings, wherein:

FIG. 2 is a detailed transverse sectional view to a larger scale showing the ends of the levers which form extensions of the rail sections within the lock-chamber;

FIGS. 3 and 4 are diagrammatic horizontal sectional views to a smaller scale illustrating two alternative embodiments according as the inclined guide ramps supplied from the lock-chamber are located either in the same plane or in two planes displaced with respect to the vertical axis of the revolving unit.

Figure 1:
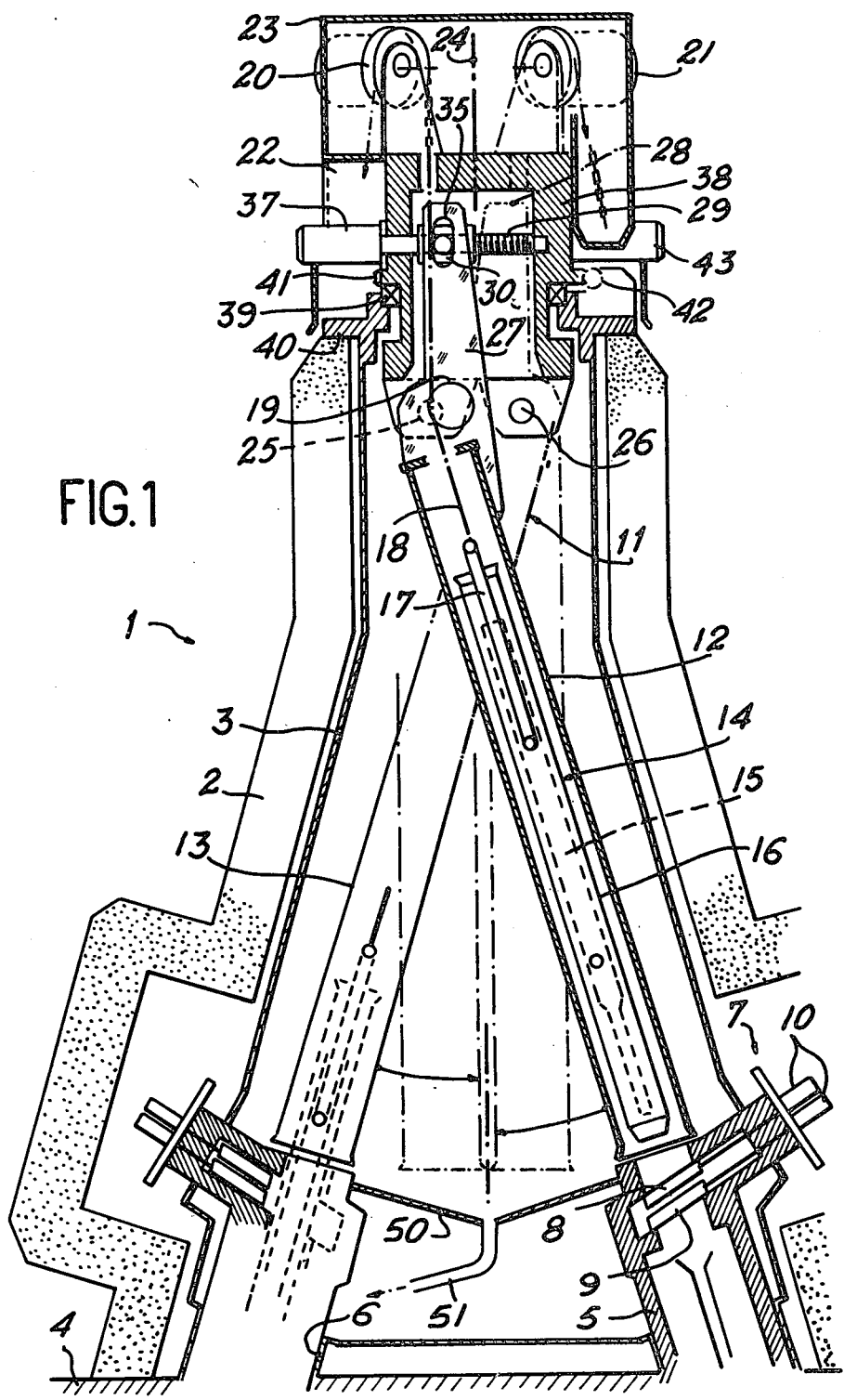
FIG. 1 is a diagrammatic axial sectional view of a leak-tight lock-chamber comprising a revolving unit and a rocking system for two rail sections in accordance with the invention.

The device shown in FIG. 1 mainly comprises a lock-chamber 1 constituted by a thick-walled outer casing 2 formed especially of lead in order to provide suitable protection of the external environment against radioactive radiations. Provision is made within said casing 2 for a leak-tight lining 3 which ensures containment of the interior of the lock-chamber with respect to contamination and in particular to α-particles. The lock-chamber 1 rests on the top portion 4 of the closure slab or vault roof of a nuclear reactor (not shown in the drawings). In accordance with conventional practice, the upper ends of two inclined guide ramps 5 and 6 respectively emerge through said closure slab. Said ramps serve to gain access in one case to the interior of the reactor vessel and in the other case to a storage container located outside said vessel. These two components have not been shown in the drawings since their structural design has little bearing on the invention. Each guide ramp 5 and 6 is associated with a closure device 7 mounted within the lock-chamber and comprising especially two inclined valve-gates 8 and 9 in cooperating relation with an independent control system 10 for shutting-off the ends of the guide ramps 5 and 6 outside periods of handling of fuel assemblies or when the lock-chamber itself is intended to be removed for repairs or maintenance.

In accordance with the invention, the lock-chamber 1 is provided internally with a rocking system 11 for two rail sections 12 and 13 respectively. In the inclined position, said sections are capable of coming into position exactly in the line of extension of the guide ramps 5 and 6 in order to ensure continuity of two slideways in conjunction with said ramps after opening of their closure devices 7. Each rail section can thus receive a moving system constituted by a fuel assembly 15 mounted within the interior of a transfer flask 16 of a type known per se, said flask 16 being provided at the upper end thereof with a coupling member 17 for the end of a handling chain which is guided over a pulley 19. The chain 18 of each section then extends vertically towards the top of the lock-chamber in order to engage with a pulley 20 of a drive winch 21 either for hoisting the moving system on the corresponding guide ramp or in a reverse movement to move said system downwards in the direction of the reactor vessel or the storage container. The chain 18 which is wound-off or wound-on the drum 20 of the winch 21 is contained within a box 22 mounted at the top portion of the lock-chamber, the complete assembly being surrounded by a protective casing 23.

In accordance with one essential arrangement of the invention, the two rail sections 12 and 13 are so arranged as to permit a swinging movement of each section independently of the other in addition to a movement of rotation of these latter about the vertical axis 24 of the lock-chamber. These two movements of rotation and swinging can take place without disturbing any displacement of the moving system or in other words without interfering with the path of the hoisting chain driven by the associated winch.

In order to displace each rail section 12 or 13 in swinging motion, each section is intended to be pivoted about a horizontal shaft 25 and 26 respectively carried by a revolving frame, said sections being provided beyond said shafts with extensions in the form of levers 27 and 28. Each lever is adapted to cooperate with an actuating screw 29, the rotation of which causes the displacement of a nut 30 over the length of said screw.

FIG. 2 illustrates in greater detail the rocking system which is adapted to the rail section 12, a similar system being naturally provided for the second section 13. In the example of construction under consideration, the shaft 25 on which the rail section 12 is pivotally mounted is constituted by two half-shafts 25a and 25b carried by bearings 31 and 32 arranged on the internal wall of the frame. At the upper end, the rail section 12 is extended by the lever 27. The nut 30 which cooperates with the actuating screw 29 is provided laterally with two lugs 33 and 34 engaged in elongated openings 35 of a stirrup-piece 36 provided at the end of said lever 27. This latter is displaced laterally to a slight extent in order to ensure that the chain 18 which is guided by the pulley 19 and located in the plane containing the vertical axis 24 of the device can actuate the flask 16 without interfering with the angular displacements of the rail section 12. These displacements are controlled by a drive motor 37 (shown in FIG. 1) which drives the screw 29 in rotation. Thus, as a result of relative positional locking of the nut 30, the movement of rotation of said screw is converted to a swinging movement of the rail section 12 about the shaft 25 of this latter. The elongated shape of the openings 35 makes it possible for the lugs of the nut 30 to move to a slight extent at the time of rotation of the rail section.

The two shafts 25 and 26 of the two rail sections are carried by another frame 38 which is mounted above the top portion of the lock-chamber 1 and the axis of which coincides with the vertical axis 24. Said frame 38 is supported by roller-bearings 39 on an annular member 40 provided at the upper portion of the lock-chamber. Said frame is provided with an external set of teeth 41 disposed in meshing engagement with an actuating screw 42 driven by a motor 43, thus producing the general pivotal motion of said frame and consequently of the two rail sections 12 and 13 which are suspended therefrom together with their associated rocking systems.

The operation of the loading and unloading device under consideration can be readily deduced from the foregoing. In a typical case which is contemplated by way of example, it is desired to carry out the exchange of a fresh fuel assembly obtained from the storage container and transferred to the rail section 13 by means of the guide ramp 6 with an irradiated fuel assembly which is transferred to the rail section 12 by means of the guide ramp 5. Each of the two fuel assemblies 15 is placed in the usual manner within a handling flask 16 filled with liquid sodium and the rail sections 12 and 13 are located in the line of extension of the guide ramps 5 and 6 respectively. In a first step, the two sections 12 and 13 are displaced in a swinging or pivotal motion in order to restore these latter to a vertical position parallel to the axis 24 of the lock-chamber. To this end, each screw 29 for actuating the levers 27 and 28 which form extensions of the rail sections is operated in the suitable direction, the amplitude of angular displacement which is achieved being either identical or different according as the ramps 5 and 6 are symmetrical or not. Once this operation has been completed, the revolving frame 38 undergoes a movement of rotation about its own axis through an angle of 180°. In a third step, the actuating screws 29 are again operated in order to bring the rail sections from the vertical position to the inclined position in which the section 12 comes into position in the line of extension of the guide ramp 6 and the section 13 comes into position in the line of extension of the guide ramp 5. The winches 21 for displacing the chains 18 which support the moving systems are then actuated so as to carry out in synchronism the downward movement of the fresh fuel assembly into the reactor vessel and of the irradiated fuel assembly towards the storage container. It should be noted that, during the different operations carried out within the lock-chamber, any possible overflow of sodium from the moving systems is collected in a bottom plate 50 provided with a discharge pipe 51. Said bottom plate is suitably dished in order to ensure that this latter does not prevent pivotal displacement of the lower ends of the rail sections under the action of the rocking systems.

FIGS. 3 and 4 illustrate diagrammatically in transverse section two alternative embodiments of the lock-chamber with rocking systems and revolving unit as described in the foregoing according as the inclined ramps 5 and 6 which lead respectively to the reactor vessel and to the storage container are located either in two laterally-displaced parallel planes (as shown in FIG. 3) or in the same vertical plane (as shown in FIG. 4). In all cases, the principle of operation and especially the operations of swinging motion of the rail sections which receive the moving systems remain the same. By virtue of the first alternative embodiment, the two rail sections can be pivoted above the same horizontal shaft if necessary, thus simplifying the construction.

The device under consideration offers specific advantages irrespective of the embodiment which may be adopted. In particular, resetting in the vertical position as a result of pivotal motion of the rail sections dispenses with the substantial range of vertical travel adopted in devices of the prior art and the length of rail sections which are changed over during rotational displacement can therefore be very substantially reduced. Under these conditions, the overall height of the lock-chamber is reduced to an appreciable extent. Rotational motion of the revolving unit within the lock-chamber also applies to two movable sections which are placed vertically in side-by-side relation without including curved portions. This results in an appreciable reduction in the volume to be protected and to be contained within the lock-chamber and therefore of the overall protection of this latter. Similarly, the area occupied on the reactor vault roof is smaller, thus facilitating the position-location of the device among the other reactor components. Finally, the transfer of the swinging-motion control elements to the top portion permits greater ease of access to this latter as well as more favorable operating conditions, especially when a screw-and-nut system as described in the foregoing examples is employed for the displacement of the rail sections in pivotal motion.

From an operational standpoint, the device in accordance with the invention also offers many advantages. The device under consideration in fact makes it possible to maintain a high loading and unloading rate since two moving systems operate simultaneously on the two guide ramps. The overall size of the device is also reduced in comparison with known devices. The double pivotal movement makes it possible to obtain operational symmetry and equilibrium since the trajectories of the moving systems are always rectilinear. The tension produced on the chains and the efforts exerted on the pulleys or other moving systems are therefore constant during the travel. Finally, the need for low speed in order to carry out vertical positioning of the moving systems on the curved rails as contemplated in design solutions of the prior art no longer arises, thus resulting in an appreciable increase in rapidity of handling operations.

In the design solution which is illustrated in FIG. 3 and makes use of laterally-displaced guide ramps, the angle of inclination of the ramps may or may not be identical, the two rail sections being supported if necessary by a single shaft located at the top, thus facilitating the design and construction of the assembly. On completion of vertical positioning, the two rail sections are accordingly juxtaposed. By rotating the revolving unit through an angle of 180°, said sections can be brought immediately in the relatively displaced planes of the two guide ramps.

It is readily apparent that the invention is not limited solely to the examples of construction which have been more especially described and illustrated in the foregoing but extends on the contrary to all alternative forms. In particular, control of pivotal motion of the rail sections by means of a system comprising an endless screw and captive nut could be replaced by other devices of like type, especially by making use of two hydraulic or pneumatic jacks. The jack bodies would be mounted outside the lock-chamber whilst only the operating stems of said jacks would penetrate into the interior in order to operate the heads of the pivotal levers. In this case, a controlled damping system can permit correct operational adaptation and achieve speed regulation.

What we claim is:

1. A device for the charge and discharge of fuel in a nuclear reactor provided with a reactor vessel and a top closure slab, said device comprising a leak-tight lock chamber placed over said top closure slab and fixed to said slab, first and second guide ramps passing through said slab, the upper end of said ramps opening into said chamber, said ramps communicating respectively with said reactor vessel and with an external storage container and being sealable by means of valves, a revolving unit having a vertical axis located within said chamber, first and second rectilinear rail sections adapted to receive a moving system together with a fuel assembly to be charged and discharged, said rail sections being carried by said revolving unit, said moving system being capable of displacement in sliding motion along each guide ramp under the action of a drive winch placed at the top of said lock chamber, means for rotating each rail section around a horizontal shaft carried by said revolving unit between a first inclined position within the extension of one of said guide ramps and a second vertical position, said rotating means comprising a lever which forms an extension of said rail section beyond the shaft thereof, and rocking means adapted to cooperate with said lever to displace said rail section from one position to the other one, and means for rotating said revolving unit around said vertical axis only when said two rail sections are in the second vertical position, said leak-tight lock-chamber having in horizontal cross section an elongated shape the greatest dimension corresponding to the position of the upper ends of said guide ramps, the lowest dimension corresponding to the two rail sections in the second vertical position.

2. A device according to claim 1, wherein the guide ramps are inclined to the vertical axis of rotation of the revolving unit and are located in the same plane.

3. A device according to claim 1, wherein the guide ramps are located in two parallel planes and displaced laterally with respect to the vertical axis.

4. A device according to claim 3, wherein the guide ramps are inclined to the vertical at different angles.

5. A device according to claim 1, wherein the rocking system of each lever which forms an extension of a rail section comprises a horizontal screw carried by the revolving frame and driven in rotation about its own axis so as to produce the displacement of a captive nut along said screw, said nut being secured against rotation by means of lateral lugs engaged in openings formed in a stirrup-piece provided at the end of said lever.

6. A device according to claim 5, wherein the openings of the stirrup-piece have an elongated shape in order to permit displacement of the lugs under the action of the pivotal motion of the rail section about its axis which is produced by the rocking system.

* * * * *